United States Patent [19]

Blake, Sr.

[11] Patent Number: 5,508,844
[45] Date of Patent: Apr. 16, 1996

[54] TELESCOPE TRACKER

[76] Inventor: Roger A. Blake, Sr., 296 Holly Ln., Woodstown, N.J. 08098

[21] Appl. No.: 299,586

[22] Filed: Sep. 1, 1994

[51] Int. Cl.⁶ ............................. G02B 7/00; G02B 23/00
[52] U.S. Cl. ...................... 359/503; 359/419; 359/894
[58] Field of Search .................................. 359/419, 423, 359/430, 429, 903, 503, 894; 354/76, 79, 219, 224, 405; 348/341

[56] References Cited

U.S. PATENT DOCUMENTS

| | | | |
|---|---|---|---|
| 3,896,463 | 7/1975 | Laskey | 354/122 |
| 4,064,516 | 12/1977 | McLaughlin et al. | 354/432 |
| 4,283,112 | 8/1981 | Venable | 359/419 |
| 4,448,500 | 5/1984 | Marling et al. | 359/503 |
| 4,729,649 | 3/1988 | Thompson | 359/511 |
| 5,039,215 | 8/1991 | Hirabayashi | 359/430 |

Primary Examiner—Paul M. Dzierzynski
Assistant Examiner—Darren E. Schuberg

[57] ABSTRACT

A telescope tracking device comprising an off-axis guider, a flip mirror image previewer, and an instrument port to attach an optical device for recording the image.

3 Claims, 5 Drawing Sheets

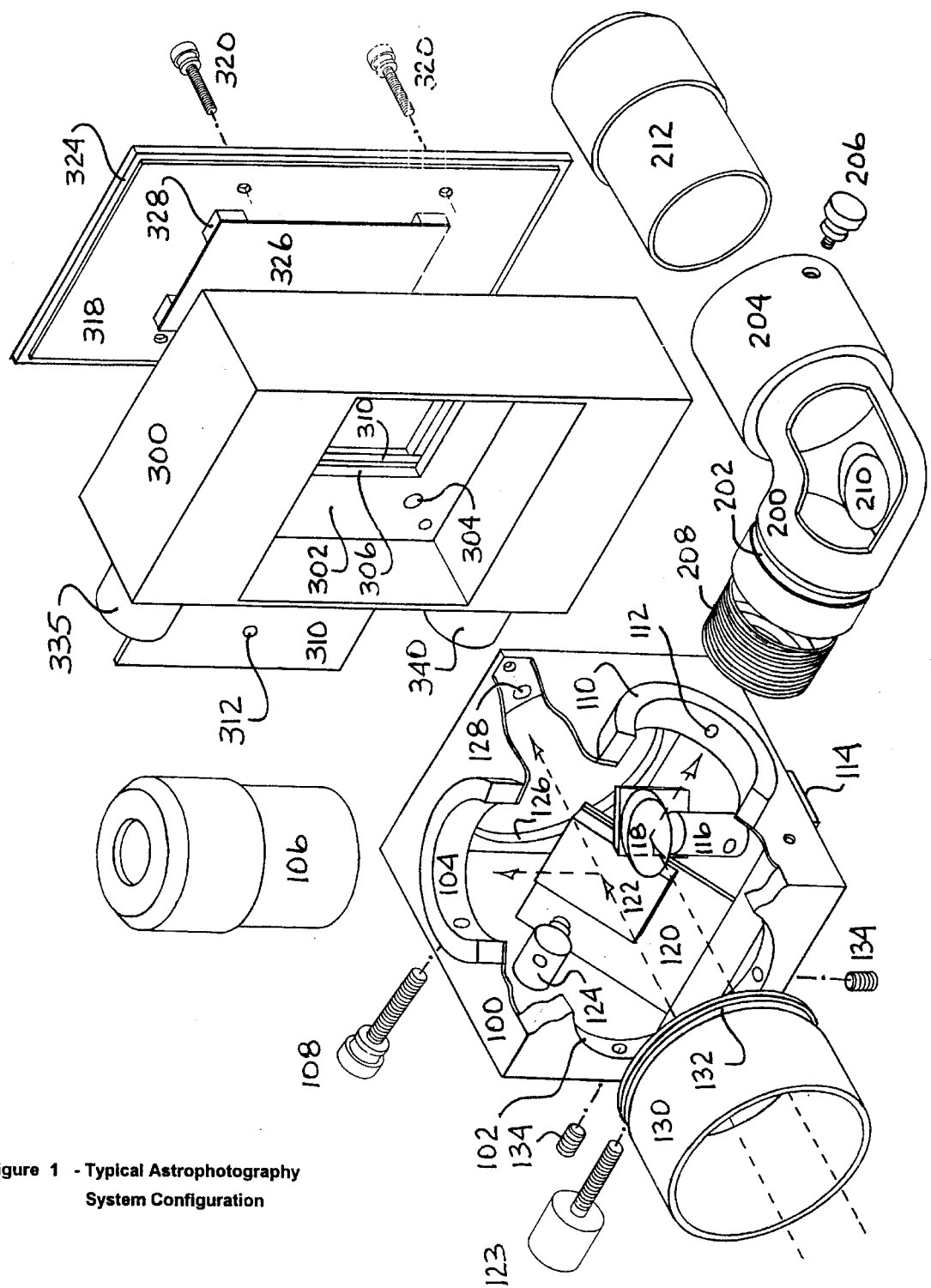
Figure 1 - Typical Astrophotography System Configuration

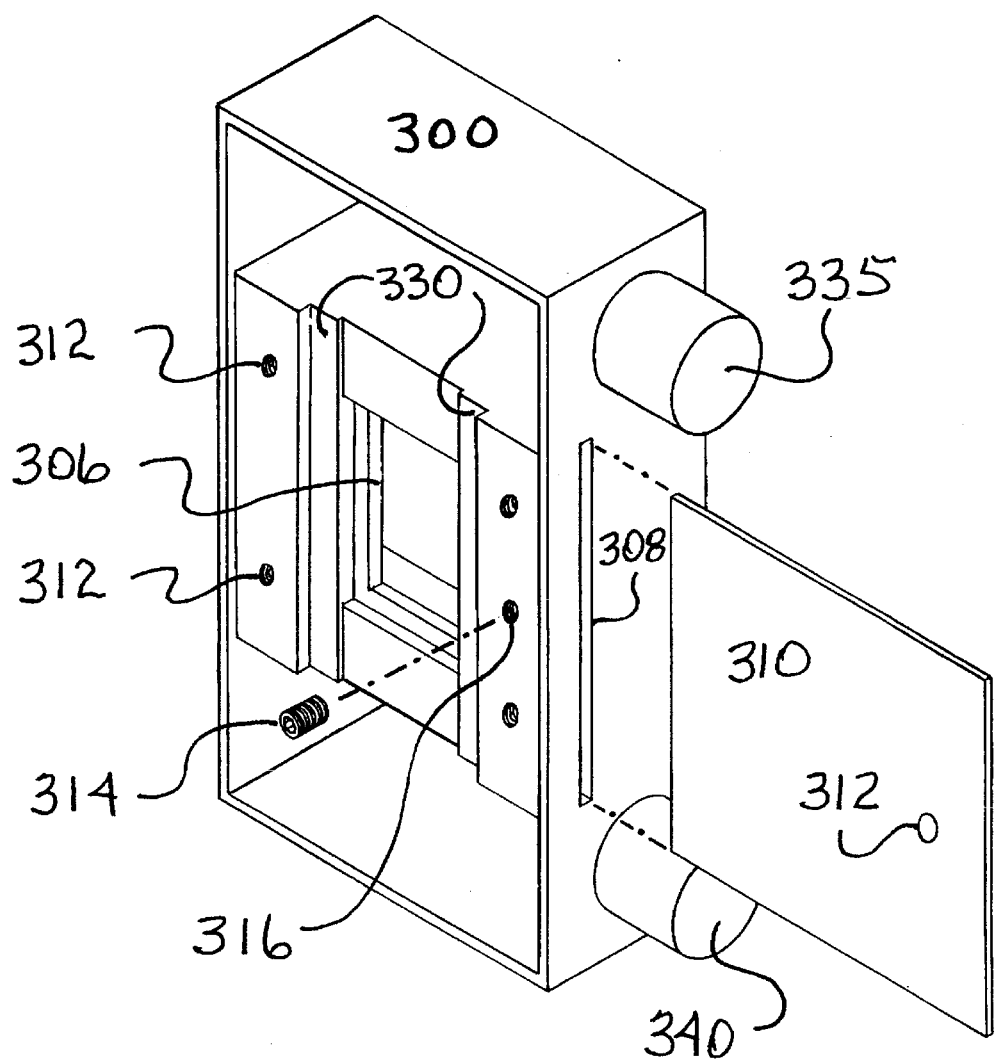
Figure 2 - Rear View of Camera

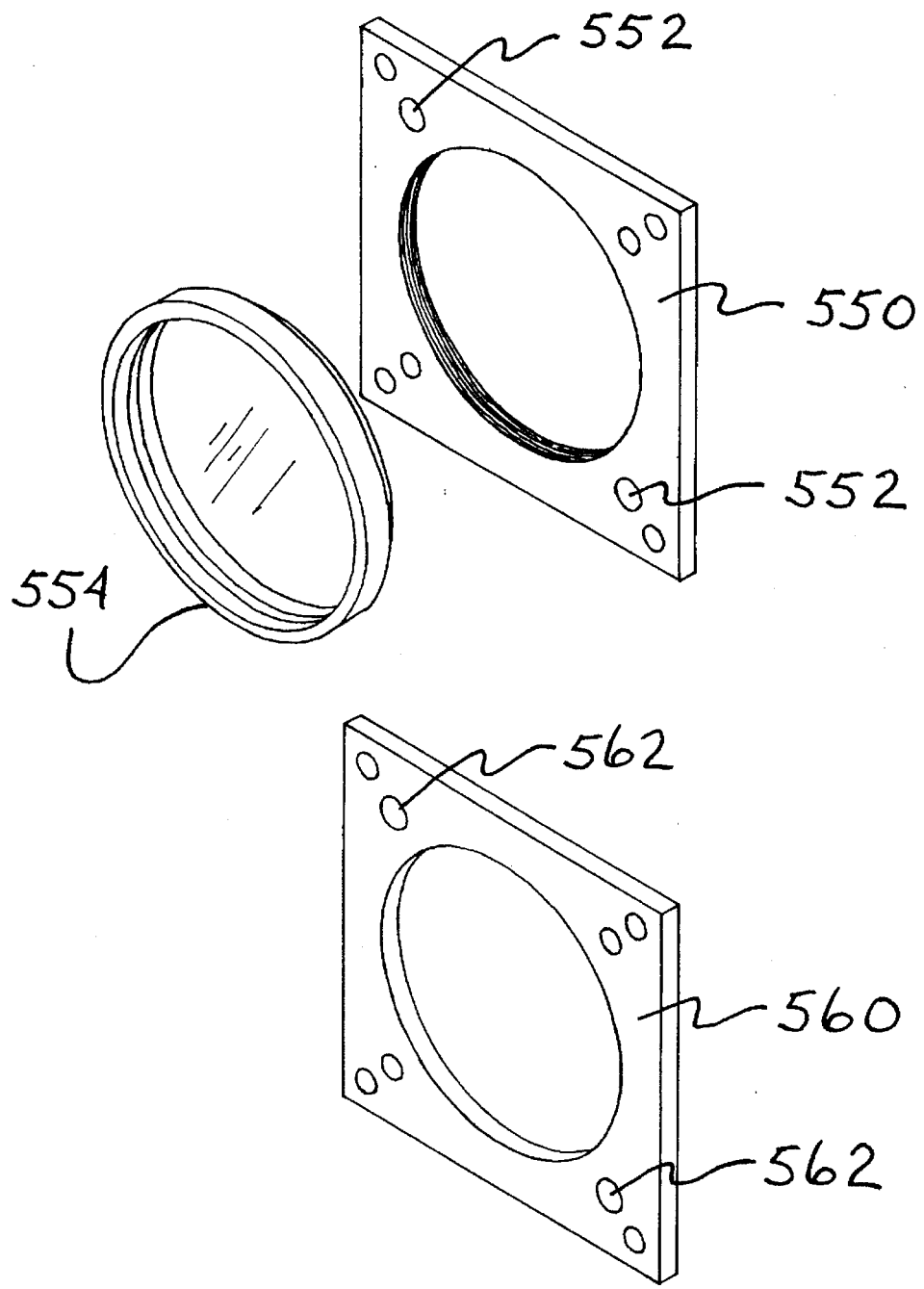
Figure 3 - Filter Holder and Spacer

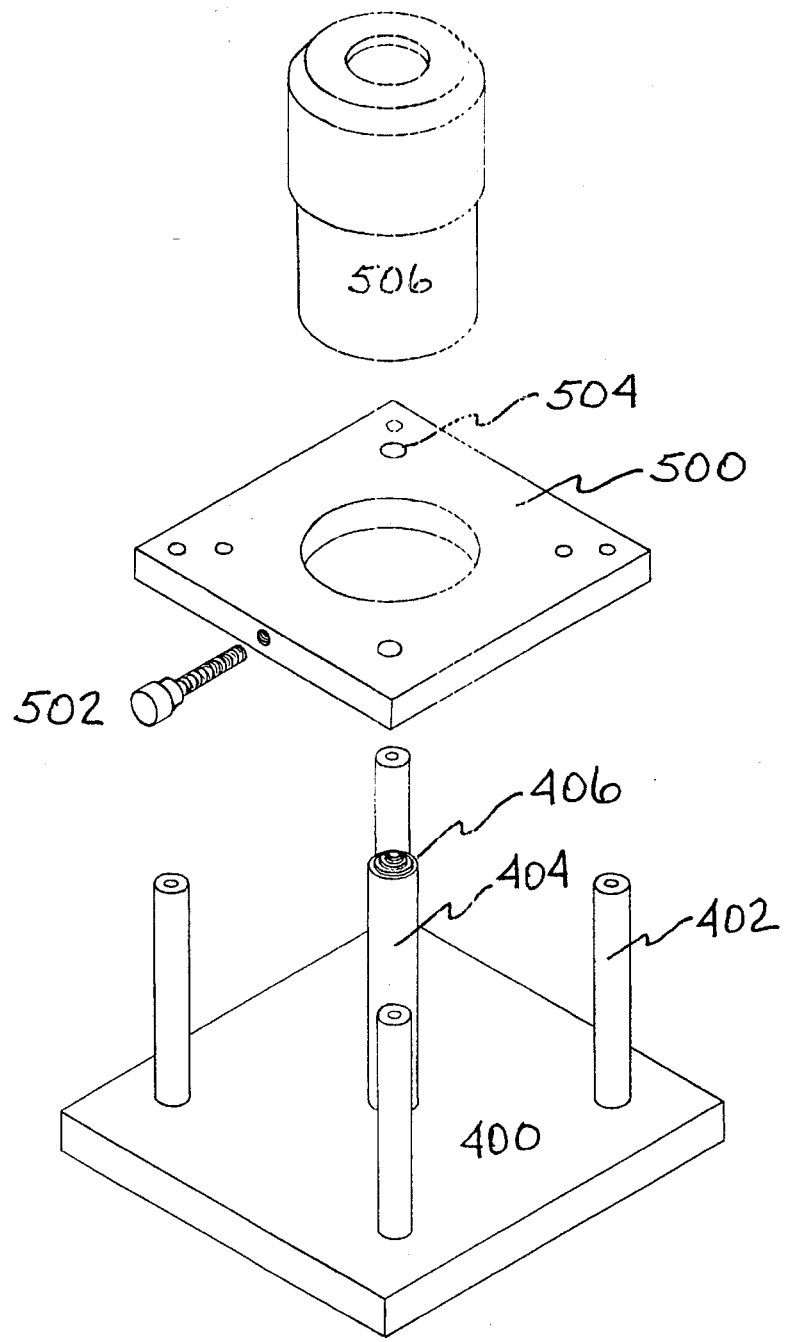
Figure 4 - Focus and Calibration Components

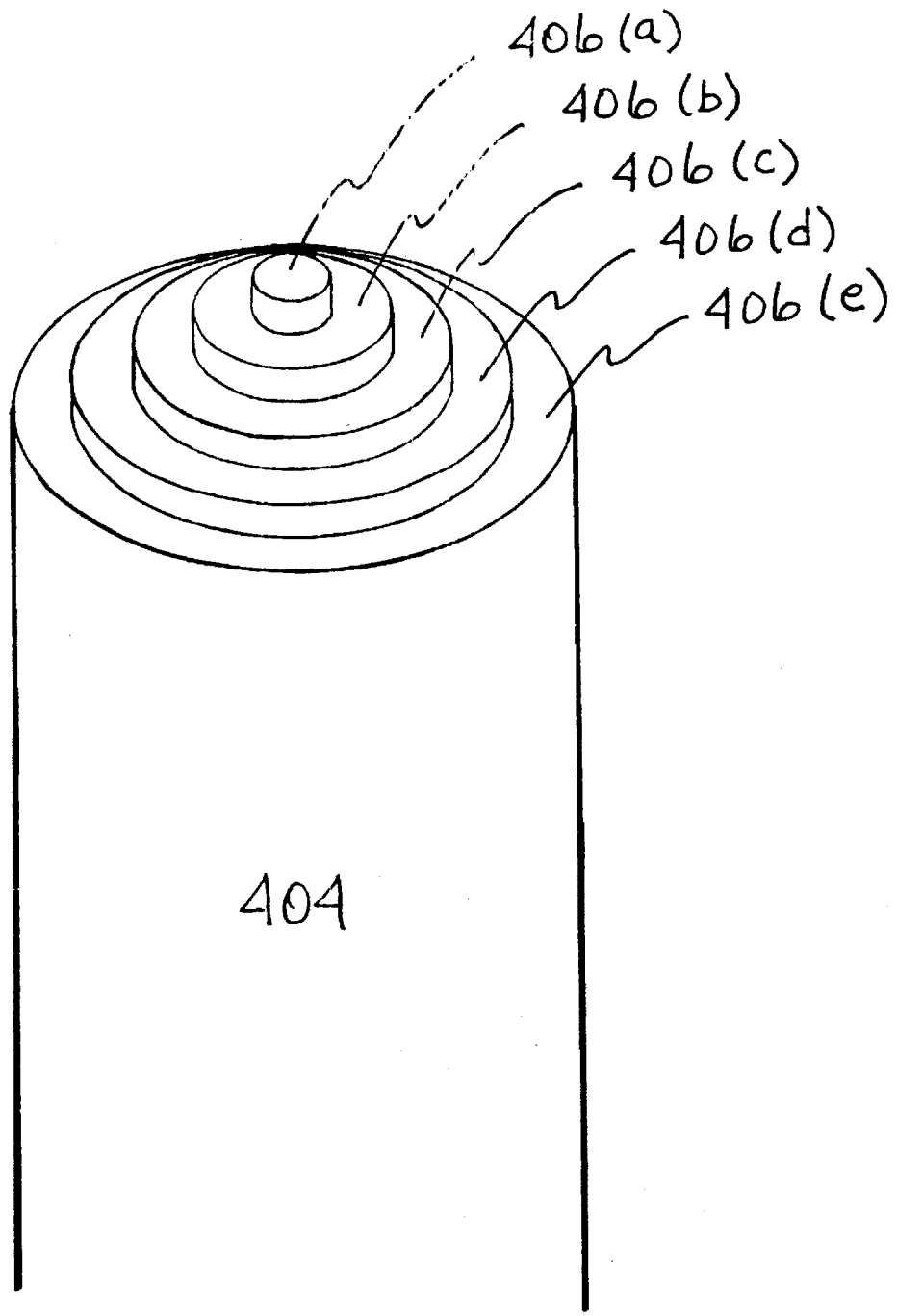
Figure 5 - Focus Calibration Targets

TELESCOPE TRACKER

FIELD OF INVENTION

This invention relates to optical instruments. In particular, it is an accessory to a telescope which is used to perform guided photography of astronomical objects.

DESCRIPTION OF PRIOR ART

Three basic pieces of equipment are required for guided astronomical photography. These are a telescope, a camera, and a guider.

The astronomical telescope consists of an optical system mounted in a manner to permit smooth, low friction rotation about two mutually perpendicular axes. At least one, and usually both of the axes are motor driven with a variable speed control. The axes permit the adjustment of the telescope orientation. The drive motors provide the continuous adjustment of the orientation needed to counteract the effects of the earth's rotation. Without the drives, the object being viewed would appear to be in continuous motion and would drift out of the field of view in about a minute.

The camera is simply a body with a shutter mechanism that contains the photographic material, or film. It is used without any lens since the telescope acts as the lens. Filters are an optional camera component which are used to block selected wavelengths of light from reaching the film.

The guider is placed between the telescope and the camera. It provides a reference for making critical adjustments to the speed of the telescope drive motors during the film exposure. Astronomical photography ordinarily requires long exposure times because of the low intensity of light received at earth from very distant objects. During the exposure period it is necessary to make fine position adjustments to correct for small errors in the axes drive rates. The Guider samples a portion of the optical field by means of a mirror or prism off the optical axis. The sampled light contains the image of a guide star which is directed into an ocular having cross-hairs. This serves as the guiding reference. As the camera exposure proceeds, one constantly varies the speed of the axes drive motors to keep the cross-hairs centered on the guide star. In this manner the image field is held stationary relative to the camera.

For proper operation, the telescope and all attached accessories must be carefully balanced. As an example, when a conventional camera is attached to or removed from one end of the telescope, a counter-weight must be attached to or removed from another location to maintain the proper balance with respect to both axes. A typical camera has a weight of about 1.7 lbs. Most telescopes can only accommodate a change of about 8 oz or less at the eye piece without requiring a change in counterbalancing.

Astrophotography requires the successful execution of several separate steps. These include target acquisition, target focusing, guide star acquisition, guiding during exposure, changing film, and changing filters.

Target acquisition is finding the object to be photographed and centering it in the telescope or camera field of view. This can be a difficult and time consuming operation because the targets are often too dim to be seen with the naked eye or through a finder scope. The locating procedure involves precision navigation using celestial coordinates. The telescope field of view is typically only ½° wide. Proper counterbalance is essential for this procedure.

Target acquisition is difficult using conventional cameras due to their weight and the ground glass focusing screens. These screens disperse too much light. This makes it impossible to see dim targets once the camera is mounted on the telescope. If target acquisition is attempted before the camera is mounted, then the target will likely be lost when mounting the camera because of two problems. The first is that the standard camera coupling is threaded and it is difficult to engage the threads without bumping the telescope. The second is that it is impossible to change both the camera and the associated counterweight simultaneously in a manner not to disturb the delicate telescope balance.

Target focusing is also difficult using conventional cameras due to the ground glass viewing screens. As described above, the targets are often too dim to be seen through these screens. This problem becomes even more acute when dark or visually opaque filters are used. An additional focusing problem is caused by the length of optical path required to accommodate the combination of conventional cameras and guiders. This is referred to as back-focus. Typical conventional camera and guider combinations require a back-focus of 4 to 5 inches. This is too long for many telescope designs.

Guide star acquisition is the process of locating a suitable guide star and centering it in the cross hairs of the guiding ocular while simultaneously maintaining the target centered in the field of view of the camera. The field of view of the guiding ocular is typically much smaller than that for the target, usually about 0.2°. Any problem that threatens the loss of target is even more serious with respect to causing the loss of the guide star. A suitable guide star must be bright enough to be visible in the guiding ocular and also be sufficiently close to the target as to be within the field of view of the guider. These two requirements typically result in only a few suitable guide stars being available for any given target.

The search for a guide star is accomplished by rotating the off-axis mirror about the optical axis, while simultaneously maintaining the target properly centered in the camera field of view. This has the effect of scanning a portion of a narrow annulus of sky around the target. The probability of finding a suitable guide star is proportional to the length and width of this annulus. Conventional guiders have an off-axis mirror or prism which can not be tilted. This restricts the width of the annulus. Guiders of previous designs have one or more serious limitations with respect to guide star acquisition. None permit the adjustment of guiding occular to a convenient viewing position independent of the choice of guide star. They either can not be rotated a full 360° without extensive modification of the telescope, or must be decoupled from the telescope to accomplish the rotation. These are serious problems. Restricted rotation reduces the probability of finding a guide star. Decoupling will allow full rotation but will destroy the target focus and often causes the loss of target. The guider and camera combination must be decoupled from the telescope, supported and rotated by hand, and then recoupled. This operation results in a loss of target focus and either an inadvertent "bump" of the scope which causes it to move or it typically causes a shift in the scope balance which can also cause it to move. In either case the target is usually lost. Once lost, the photographer must re-initiate the target acquisition procedure. The inability to independently adjust the occular position effectively eliminates many potential guide stars. It causes a significant portion of the annulus region to be unusable because the guiding occular would be in an inaccessible or in an inconvenient viewing location.

An additional problem with conventional guiders is that they do not permit the simultaneous viewing of the target and guide star. This is a serious disadvantage because the target must be centered in the field of view when the guide star has been centered in the cross hairs. Since the target is usually too dim to be seen on the ground glass focusing screen of conventional cameras, the centering of the target during guide star acquisition cannot be verified. The result is that when using conventional equipment, the guide star acquisition is accomplished blind with respect to target position. One simply hopes that the target is somewhere near the center and competes the exposure without verification. The actual target position is not known until the film is developed.

Guiding is the act of making fine adjustments to the rate of the telescope drive motors during exposure of the photographic material. As the exposure proceeds, one constantly varies the speed of the axes drive motors to keep the cross-hairs centered on the guide star. In this manner the image field is held stationary relative to the camera. Typical guided exposures are an hour in length. Guiding is sometimes difficult or impossible with conventional guiders because of inconvenient positions of the guiding ocular. Conventional guiders do not permit the position of the guiding ocular to be adjusted independently of the choice of guide star. The only adjustment permitted is the rotation about the optic axis in search of the guide star. Sometimes the only guide star available causes the ocular to be in either an inaccessible or uncomfortable position, and the object can not be photographed.

Changing film or filters is often required during the photography of a given target. Both require the removal of the camera and are difficult to accomplish with conventional camera and guider combinations. The problem is similar to that described above for target acquisition. The removal and remounting of the camera will usually result in loss of guide star or loss of target, or both due to the threaded manner of camera coupling, or the change in balance.

SUMMARY OF INVENTION

The objects of my invention are:

(a) to provide a full 360° guide star search field without decoupling the camera or guider;

(b) to permit the widest possible guide star search field annulus and two dimensional guide star positioning relative to the cross hairs without changing the positioning of the telescope;

(c) to provide simultaneous viewing of both the guide star and the target during guide star acquisition to permit simultaneous centering of both.

(d) to provide adjustment of the position of the guiding ocular to permit convenient viewing independent of the guide star location.

DRAWINGS FIGURES

FIG. 1 is a isometric exploded view of the astrophotography system as it would be used on the telescope.

FIG. 2 is an isometric view of the camera from the back, showing the internal film tracks.

FIG. 3 shows the filter holder and filter spacer components.

FIG. 4 is an isometric view of the focus calibrator, eyepiece holder, and focusing eyepiece.

FIG. 5 is an enlargement of the focus calibrator target showing the various target surfaces.

REFERENCE NUMERALS IN DRAWINGS

| REFERENCE NUMERALS IN DRAWINGS | | | |
|---|---|---|---|
| 100 | Tracker Body | 124 | Flip mirror stop |
| 102 | Front aperture | 126 | Rear Aperture |
| 104 | Viewing port eyepiece collar | 128 | Tracker coupling magnets (2) |
| 106 | Viewing eyepiece | 130 | Adapter insert |
| 108 | Viewing port eyepiece locking thumbscrew | 132 | Adapter insert coupling groove |
| 110 | Tracking port eyepiece collar | 134 | Adapter insert set screws (4) |
| 112 | Tracking port eyepiece locking screws (3) | 200 | Barlow body |
| 114 | Off-axis lever | 202 | Barlow locking groove |
| 116 | Off-axis mirror holder | 204 | Barlow eyepiece socket |
| 118 | Off-axis mirror | 206 | Barlow eyepiece locking Thumbscrew |
| 120 | Flip mirror holder | 208 | Barlow lens and lens cell |
| 122 | Flip mirror | 210 | Barlow diagonal mirror |
| 123 | Flip mirror knob | 212 | Tracking eyepiece |
| 300 | Camera body | 340 | Film rewind knob |
| 302 | Camera recessed front plate | | |
| 304 | Camera coupling magnets (2) | | |
| 306 | Camera aperture | 400 | Focus calibrator plate |
| 308 | Camera shutter slot | 402 | Focus calibrator eyepiece holder supports (4) |
| 310 | Camera shutter | | |
| 312 | Camera shutter locking magnet | 404 | Focus calibrator target shaft |
| 314 | Camera shutter locking magnet set screw | 406 | Focus calibrator target |
| 316 | Camera shutter locking magnet set screw hole | 500 | Eyepiece holder |
| 318 | Camera rear cover | 502 | Eyepiece holder locking thumbscrew |
| 320 | Camera cover attachment screws | 504 | Eyepiece holder coupling magnets (2) |
| 322 | Camera cover attachment screw holes (4) | 506 | Focusing eyepiece |
| 324 | Camera cover light barrier notch | 550 | Filter holder |
| 326 | Film backing plate | 552 | Filter holder coupling magnets (2) |
| 328 | Film backing plate mounting pads | 554 | Filter |
| 330 | Film tracks | 560 | Filter spacer |
| 335 | Film advance knob | 562 | Filter spacer coupling magnets (2) |

DESCRIPTION OF FIGURES

FIG. 1 illustrates a typical embodiment of my invention as it would be used on a telescope to take a photograph. Four general components are shown: a Tracker 100, Barlow 200, Camera 300, and user supplied eyepieces 106 and 212.

Tracker 100 is a plastic box with four apertures. A front aperture 102 accepts an aluminum adapter insert 130 which is attached with four nylon set screws 134 which engage the insert groove 132. This arrangement permits the insert to rotate smoothly a full 360° inside the front aperture. The adapter insert connects the Tracker to the telescope. A second or top aperture is formed by a collar 104 which accepts an eyepiece 106 which is locked in place with a thumbscrew 108. A third or rear aperture 126 couples magnetically to either a camera 300 or an eyepiece holder 500 and focusing eyepiece 506 (FIG. 3). Coupling magnets 128, 304, 504, 522, 562 are in sets of two magnets arranged diagonally opposed to the respective aperature centers. The spatial arrangements are identical for each set. Because of the view angle, only one magnet of sets 128 and 304 are shown in FIG. 1. However, both magnets are shown for sets 504 in FIG. 4 and 552, 562 in FIG. 3. These magnet sets permit a simple touch coupling or removal of components. A fourth or side aperture is formed by a collar 110 which accepts a Barlow body 200 which is locked in place by three nylon screws 112 which engage notch 202. This arrangement permits the Barlow to rotate a full 360° in the collar. Inside the Tracker are two moveable mirrors. A flip mirror 122 is mounted on holder 120 which is attached to knob 123 which is used to position the mirror in either the up-position against stop 124 (shown) or down position. An off-axis mirror 118 is mounted on holder 116 which is attached to a lever 114 which is used to rotate the mirror.

The Barlow body 200 is a 90° elbow which accepts a threaded lens and cell 208 at one end and a tracking eyepiece 212 in a socket 204 at the other end. The eyepiece is held in position by a thumbscrew 206. The lens cell 208 contains a lens of negative focal length and threads into the inside of the Barlow body 200. This permits the adjustment of the position of the lens with respect to the mirror 210. The Barlow can rotate a full 360° in the Tracker collar 110 even when the camera 300 is coupled to the Tracker.

The camera 300 is a plastic container to hold the film. It has a simple sliding shutter 310, a recessed front plate 302 to minimize the back-focus, magnets 304 to couple to the Tracker, and simple traditional film wind 335 and rewind 340 mechanisms. A camera cover 318 is attached with four screws 320. The cover has a notch 324 along the periphery which rests on the edge of the camera body to form a light barrier. A film backing plate 326 is attached to the inside of the cover with several compressible foam pads 328.

FIG. 2 is a rear view of the camera 300 with the cover 318 removed. The shutter 310 enters the camera body through a slot 308. The shutter contains a magnet 312 which is used to hold the shutter in the closed position when the magnet is aligned with and is attracted to a set screw 314 which is threaded in a hole 316 over the shutter. The film rests on two tracks 330 and is held flat by the film backing plate 326 (FIG. 1). The cover screw 320 thread into holes 312.

FIG. 3 shows a filter holder 550 and a filter spacer 560. These components permit the convenient use of filters. They are inserted between the Tracker 100 and the camera 300. The filter spacer or holder magnets 552, 562 couple to both the Tracker and camera magnets 128, 304. A filter 554 threads into the aperture of the holder 550.

FIG. 4 shows the components needed for focus calibration. The focus calibrater consists of a target shaft 404, a target 406, and supports 402, all attached to a plate 400. An eyepiece holder 500, containing a focusing eyepiece 506 rests on the four supports 402. The length of the target shaft 404 is longer than the supports by an amount equal to the distance from the camera front plate 302 to the film tracks 330 (FIG. 2). The focusing eyepiece is held in position with thumbscrew 502.

FIG. 5 is an enlargement of target 406 which has the general shape of a bulls-eye. The central circle forms the highest surface 406(a). The first ring forms an annular surface 406(b) which is lower than the surface 406(a). Succeeding rings form lower surfaces 406(c)–406(e). Each surface 406(a)–406(e) represents a focus calibration target for a specific type of filter 554 (FIG. 3). The highest surface 406(a) is used when no filter is to be used. The surface 406(b) is used with a filter of 1 mm thickness, 406(c) for 2 mm, 406(d) for 3 mm, and 406(e) for a 4 mm thick filter. The differences in the heights of the surfaces account for the shift in the image position due to the thickness of the filter.

OPERATION

The astrophotography system is used in several different modes which include focusing, target acquisition, guidestar acquisition, and finally photography. In all modes the Tracker is attached rigidly to the telescope focusing mechanism which clamps tightly to the adapter insert 130. The Tracker body 100 can then rotate smoothly about the insert riding on the four nylon set screws 134 which engage the insert groove 132. This rotation enables the search for a suitable guide star during guide star acquisition described below without loss of focus or target. This design is unique because it permits a full 360° Tracker rotation without modification of the telescope or decoupling of the apparatus from the telescope. The insert 130 is designed to mate directly with the standard telescope focusers, therefore telescope modification is not required. The only requirement is that the insert terminate in a cylindrical section with groove 132. Since the rotation occurs between the insert and the Tracker body rather than between the insert and the telescope, the need for decoupling is eliminated. The Tracker configuration is also the same for all modes. The Barlow 200 is rotatably attached in collar 110, the tracking eyepiece 212 is locked in socket 204, and the viewing eyepiece 106 is locked in collar 104. The right angle design of the Barlow 200 together with its rotational attachment to the Tracker provides the ability to adjust the guiding occular to a convenient viewing position independent of the choice of guide star. This additional adjustment feature is not available on guiders of previous designs.

The only change in the system configuration during operation is whether the camera 300 or the eyepiece holder 500 and eyepiece 506 is attached to the rear aperture 126 of the Tracker. Both components attach magnetically to the Tracker. The telescope counterbalance is adjusted with the Tracker attached to the telescope. This assures that the only change in the counterbalance when changing components is that associated with the weight of the components being removed or attached to the rear aperture. Since all of these components are specifically designed to be light weight, not significantly more than 8 oz each, this assures that the change in counterbalance will be negligible. The magnetic touch and hold coupling combined with the lightweight components assure that the components can be quickly and easily changed in the dark without loss of target or guidestar acquisition.

Once the Tracker has been rigidly attached to the telescope, the next operational step is to calibrate the position of the focusing eyepiece 506 in the eyepiece holder 500. The focusing eyepiece is mounted in the holder and thumbscrew 502 is tightened only lightly to permit the eyepiece to be easily slid up or down in the holder. The holder is then placed on the four supports 402. The operator then views the target 406 through the eyepiece and adjusts the position of the eyepiece up or down until the target is in sharp focus and then thumbscrew 502 is tightened to hold the eyepiece firmly. If no filter is to be used then the central uppermost target surface 406(a) is used. If a filter is to be used than one of the lower ring target surfaces 406(b)–406(e) is used. The choice of ring depends on the thickness of the filter. The position of the target 406 relative to the supports 402 is essentially the same as the camera focus distance which is the distance between the film emulsion, which is in direct contact with the camera tracks 330, and the front plate 302 of the camera. The calibration of the focusing eyepiece position in the holder assures that the distance from the bottom of the holder to image plane of the eyepiece is also the same as the camera focus distance. The eyepiece holder and eyepiece are then used to focus the Tracker as described below.

In the focusing mode, flip mirror 120/122 is placed in the down position by rotating knob 123, the camera 300 is removed from the Tracker rear aperture 126, and is replaced with and eye piece holder 500 containing a focusing eyepiece 506 which has been previously calibrated as explained above. This change in components is accomplished magnetically by simply lifting the camera away from the rear of the Tracker and then simply touching the eyepiece holder to the Tracker. The telescope is then positioned to view any convenient celestial target such as a bright star. The operator views the image of the star through the focusing eyepiece and then adjusts the telescope focusing mechanism until the star is in sharp focus. This assures that the distance between the image plane of telescope and the rear surface of the tracker 126 is the same as the camera focus distance. The last step is to adjust the focus of the viewing eyepiece 106 in collar 104. The flip mirror is placed in the up position and the star image is viewed through the viewing eyepiece which is then adjusted up or down until the image is in sharp focus, and the thumbscrew 108 is tightened.

The next step is target acquisition. This is generally accomplished with the eyepiece holder and focusing eyepiece still mounted on the Tracker, but this is not required. The telescope is repositioned to view the celestial object to be photographed. The target is viewed through the viewing eyepiece with the flip mirror up while the telescope position is adjusted to center the target in the field of view of the viewing eyepiece which is also the field of view of the camera.

The next step is guidestar acquisition which accomplished without changing the position of the telescope. With the telescope centered on the target, the operator views the off-axis image through the guiding eyepiece 212 in the Barlow socket 204. The center of the field of view of this eyepiece is about ½° to 1° away from the target and will usually contain several field stars. The Barlow 200 may be rotated in the Tracker collar 110 to achieve a convenient eye position. This will rotate the field of view of the guiding eyepiece about its center but will not change the center position. For the purpose of guiding, this rotation is irrelevant. The position of the guiding eyepiece is then adjusted in or out of the socket until the field stars are in best focus and then the thumbscrew 206 is tightened. With the guiding eyepiece in focus, the Tracker 100 is then rotated slowly on the insert 130 while viewing through the eyepiece. As the Tracker is rotated, the field of view of the guiding eyepiece sweeps through an annulus around the target. The purpose of this sweep is to find a bright field star that can be used for guiding. The rotation of the Tracker body on the insert 130 permits the search to be accomplished without decoupling the Tracker from the telescope. This eliminates the loss of target or target focus associated with decoupling. This design is unique because it permits a full 360° Tracker rotation without modification of the telescope. A modification is not required because the insert 130 is adapted to the existing telescope equipment.

The rotation of the Barlow 200 in the Tracker collar 110 represents a degree of position adjustment freedom for the guiding ocular which is independent of the choice of guide star. This freedom permits the full 360° access to the annulus of sky containing potential guide stars because it eliminates the potentially inconvenient or inaccessible positions of the guiding ocular. This degree of freedom is not found on guiders of previous designs. The width of the annulus can be made larger during the sweep by slightly rotating the off-axis mirror 118. This is accomplished by rotating the off-axis lever 114. When a suitable guide star is found it is centered in the crosshairs of the guiding eyepiece by a final rotational adjustment of the Tracker 100 and the off-axis lever 114. This final adjustment is accomplished by alternately viewing the target through the viewing eyepiece 106 to assure that it remains centered, and viewing the guidestar through the guiding eyepiece 212 to center the guide star in the cross hairs.

The last step is to photograph the target. With both the target and guide star properly centered, the eyepiece holder is removed from the Tracker and is replaced by the camera. The camera shutter 310 is pulled out to begin the film exposure while the operator views the guidestar through the guiding eyepiece. If the guide star drifts away from the center of the crosshairs, the operator adjusts the telescope drive speeds to compensate and bring it back. This continues for about an hour when the exposure is ended by replacing the shutter.

The above descriptions for focusing, and photographing assume that a filter is not used. The use of a filter during the photograph requires two small changes to the operational procedure. The first is that the filter spacer 560 is placed between the eyepiece holder 500 and the Tracker rear surface 126 in the focusing mode. This shifts the image position to account for the presence of the filter holder 550 which is placed between the camera 300 and the Tracker rear surface during the final photographing mode. The additional shift in the image position due to the filter thickness is accounted for by using one of the lower target surfaces 406(b)–406(e) during the calibration of the focusing eyepiece.

I claim:

1. An apparatus to provide a guiding reference for adjusting the position of a telescope during the photography of astronomical objects comprising:

(a) a body having a front aperture, a side aperture, a rear aperture, and a cavity extending through said apertures;

(b) a first coupling means positioned near said front aperture for attaching a first optical device thereto for viewing through said cavity along a first axis;

(c) a second coupling means positioned near said side aperture for rotationally attaching a second optical device thereto for viewing along a second axis oriented at a first angle to said first axis, said first angle not substantially less than 45 degrees;

(d) a third coupling means positioned near said rear aperture for attaching a third optical device;

(e) a first means to bend light rays from a peripheral portion of the optical field along said first axis to said second axis, said first bending means positioned in said cavity near said second coupling means;

(f) the said second optical device comprising: a housing which is rotationally coupled to said second coupling means; a second means to bend light rays from along said second axis to a third axis oriented at an angle not substantially less than 45 degrees to said second axis and a means to hold a guiding occular oriented to view along said third axis, whereby the rotation of said second optical device in said second coupling means permits the positioning of the guiding occular into a convenient viewing position without changing the position of the center of the field of view of said guiding occular.

2. Apparatus as recited in claim 1, wherein the position of the first light bending means may be adjusted to vary the angle between the said first and second axes.

3. Apparatus as recited in claim 1, wherein the said first coupling means permits the rotation of said apparatus relative to the first optical device about the said first axis, whereby said rotation is accomplished without uncoupling said apparatus from said first optical device, and without modification of said first optical device.

\* \* \* \* \*